(12) United States Patent
Andrew

(10) Patent No.: US 7,215,665 B2
(45) Date of Patent: May 8, 2007

(54) APPARATUS FOR SWITCHING TIME DIVISION MULTIPLEX CHANNELS

(75) Inventor: Stephen Paul Andrew, Ivybridge (GB)

(73) Assignee: Zarlink Semiconductor Limited (GB)

(*) Notice: Subject to any disclaimer, the term of this patent is extended or adjusted under 35 U.S.C. 154(b) by 1045 days.

(21) Appl. No.: 10/202,925

(22) Filed: Jul. 25, 2002

(65) Prior Publication Data

US 2003/0053491 A1    Mar. 20, 2003

(30) Foreign Application Priority Data

Jul. 26, 2001 (GB) .................................. 0118196.5

(51) Int. Cl.
*H04L 12/50* (2006.01)

(52) U.S. Cl. .................. 370/375; 370/372; 370/535

(58) Field of Classification Search ..................... None
See application file for complete search history.

(56) References Cited

U.S. PATENT DOCUMENTS

| | | | |
|---|---|---|---|
| 5,305,322 A | | 4/1994 | Kabaya et al. |
| 5,343,467 A | | 8/1994 | Wöhr |
| 5,818,834 A | | 10/1998 | Skierszkan et al. |
| 5,841,771 A | * | 11/1998 | Irwin et al. .................. 370/360 |
| 5,862,136 A | * | 1/1999 | Irwin ...................... 370/395.4 |
| 6,101,198 A | * | 8/2000 | Koenig et al. .............. 370/535 |
| 6,850,490 B1 | * | 2/2005 | Woo et al. .................. 370/230 |
| 2001/0036181 A1 | * | 11/2001 | Rogers ........................ 370/389 |
| 2002/0034194 A1 | * | 3/2002 | Young et al. ................ 370/498 |
| 2002/0181475 A1 | * | 12/2002 | Dove et al. ................. 370/398 |
| 2003/0081624 A1 | * | 5/2003 | Aggarwal et al. .......... 370/412 |

FOREIGN PATENT DOCUMENTS

| | | |
|---|---|---|
| EP | 0587944 A1 | 9/1992 |
| EP | 0658990 A1 | 12/1994 |
| GB | 2.128450 A | 7/1983 |

\* cited by examiner

*Primary Examiner*—Phirin Sam
(74) *Attorney, Agent, or Firm*—Thompson Hine LLP

(57) ABSTRACT

A time division multiplex switching apparatus is provided for switching channels from any number of input data streams, each of which may have any of a plurality of data rates, to any of a plurality of output data streams, each of which may likewise have any one of a plurality of data rates. An input block 1 comprises a respective input channel for each input stream. Each channel has a variable delay circuit. The outputs of the channels are supplied to a buffer memory 3 which stores data from the input channels in a first order and reads out the data in a second order according to the channel connections required. A controller 2 controls the variable delay circuits 12–14 independently of each other so as to align the data streams from the input channels irrespective of the input stream data rates. For example, the streams may be aligned such that the zeroth channel of a predetermined frame in the input streams appear consecutively at the outputs of the input channels.

6 Claims, 8 Drawing Sheets

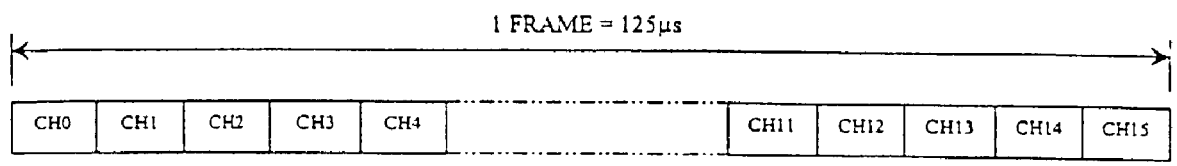
Figure 1 - 1.024Mb/s TDM Frame
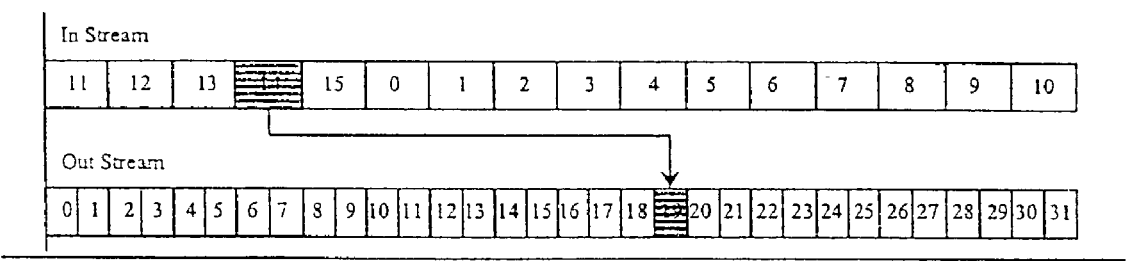
Figure 2 - Multi-Stream Rate TDM Switching Example

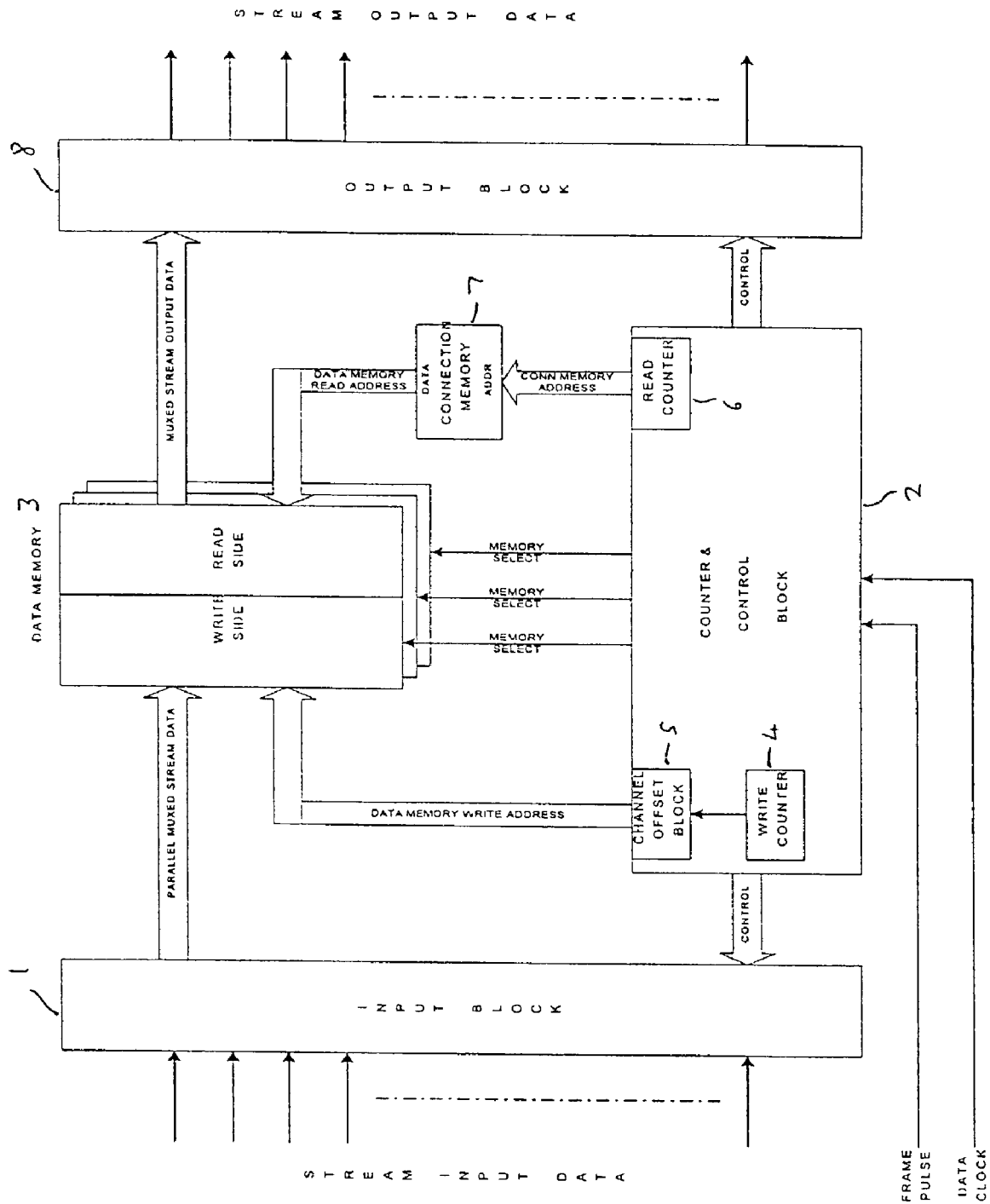
Figure 3 – BASIC SWITCH ARCHITECTURE

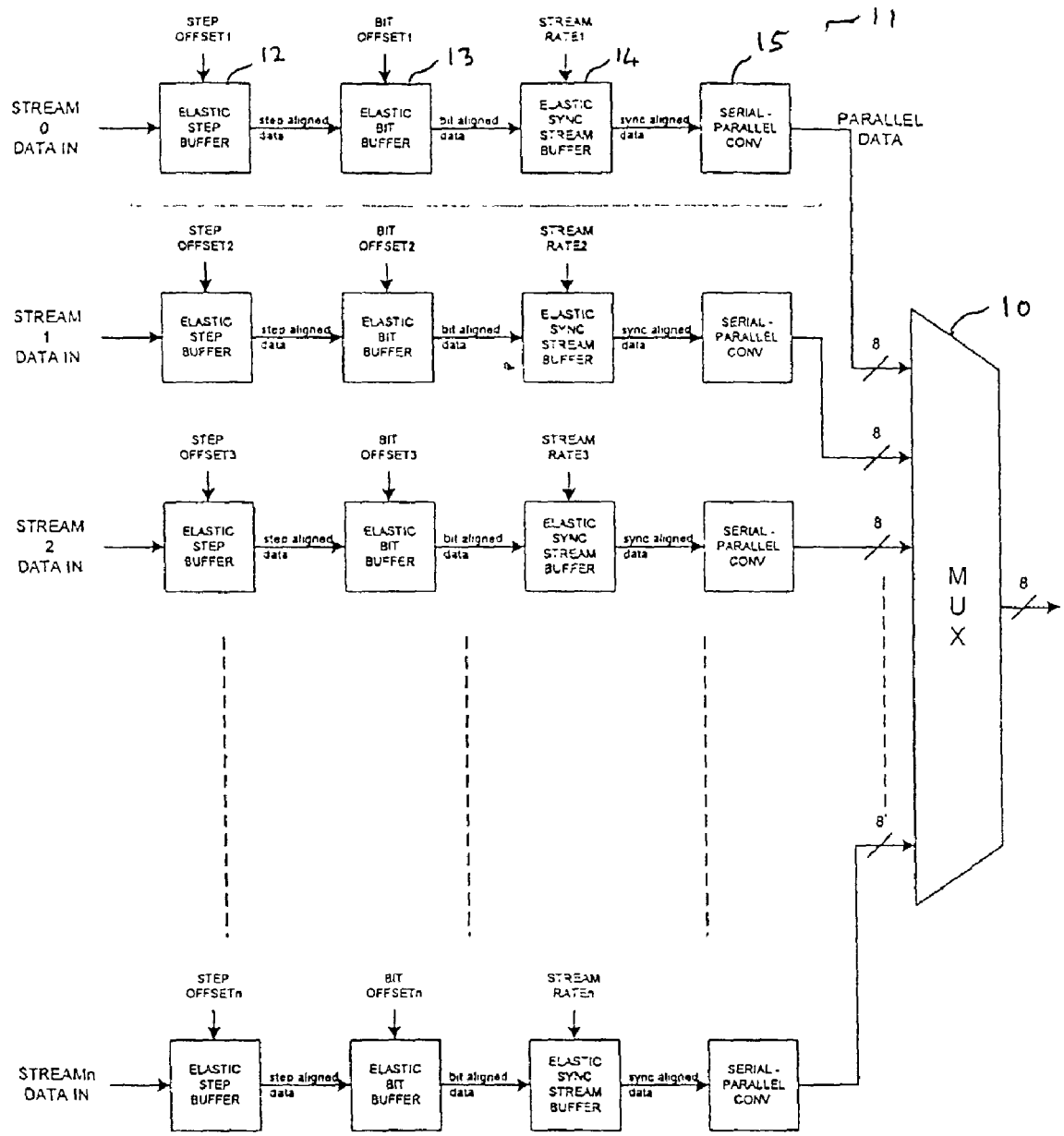
Figure 4 - INPUT BLOCK

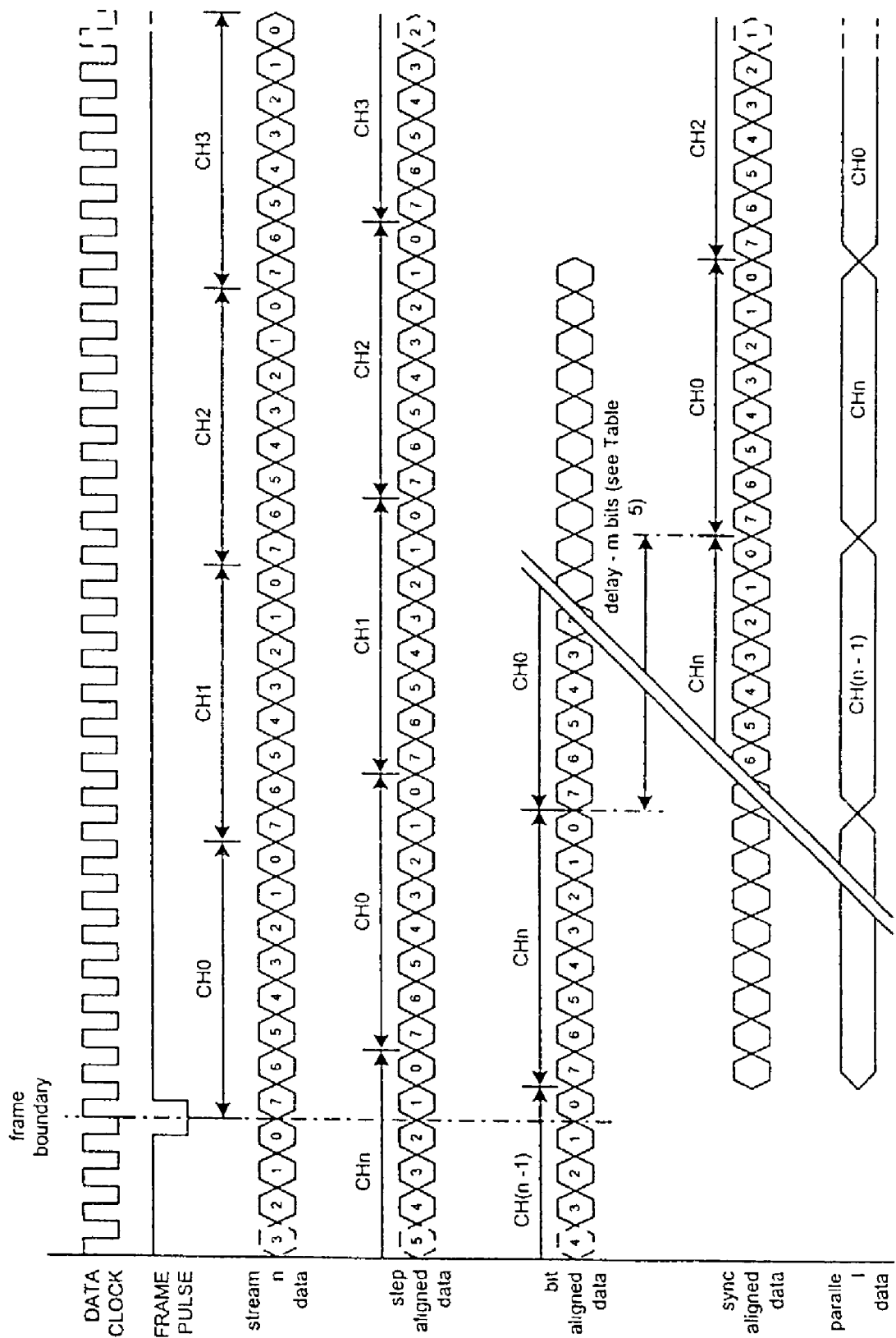
Figure 5 - Input Stream Data Processing

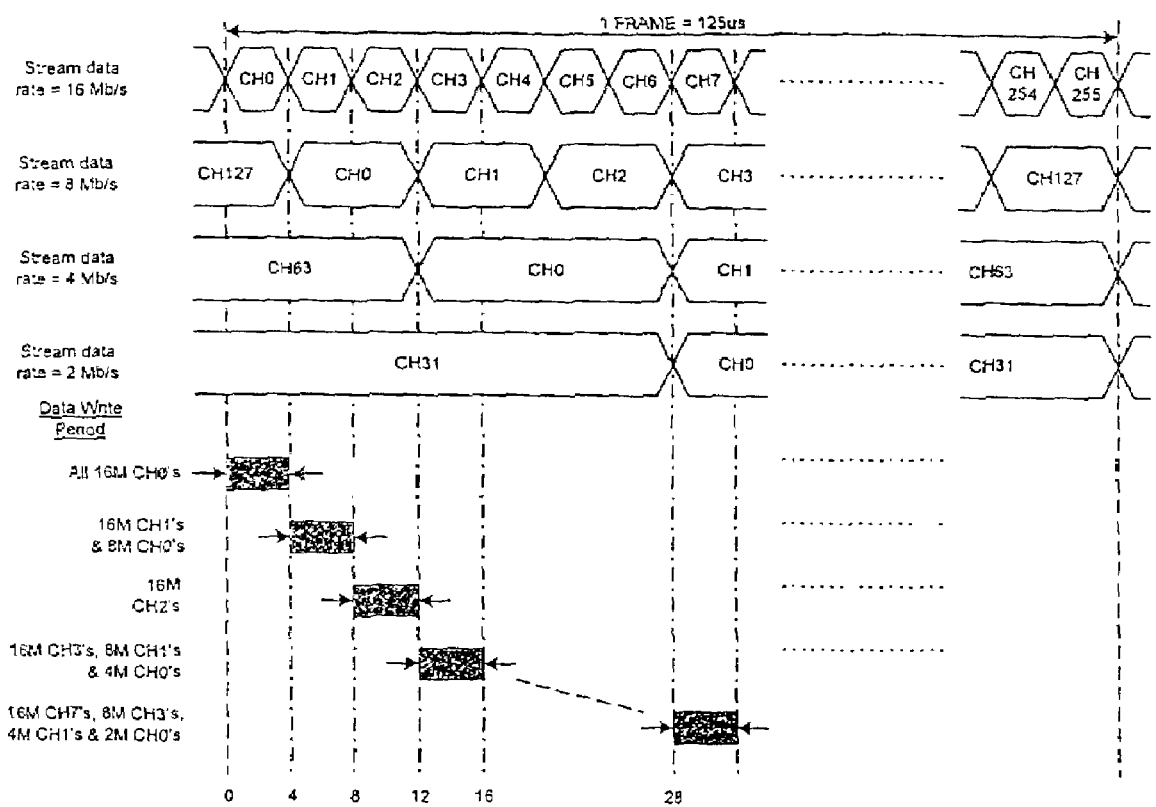
Figure 6 - Data Alignment vs Stream Rate

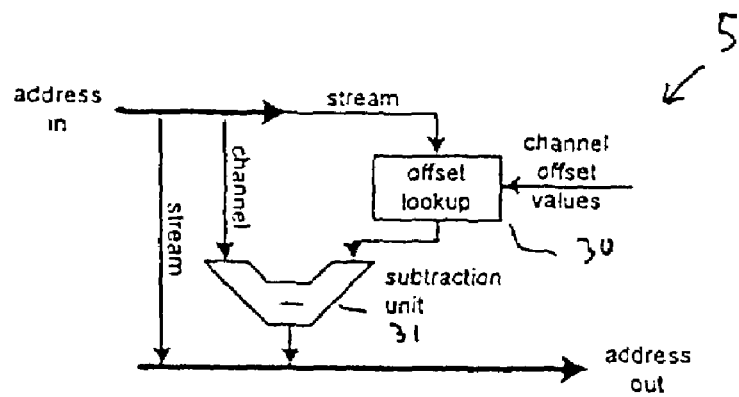
Figure 7 - Channel Offset Block
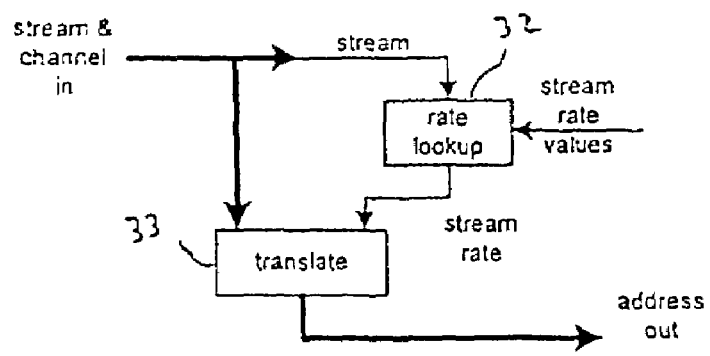
Figure 8 - Address Translate Block

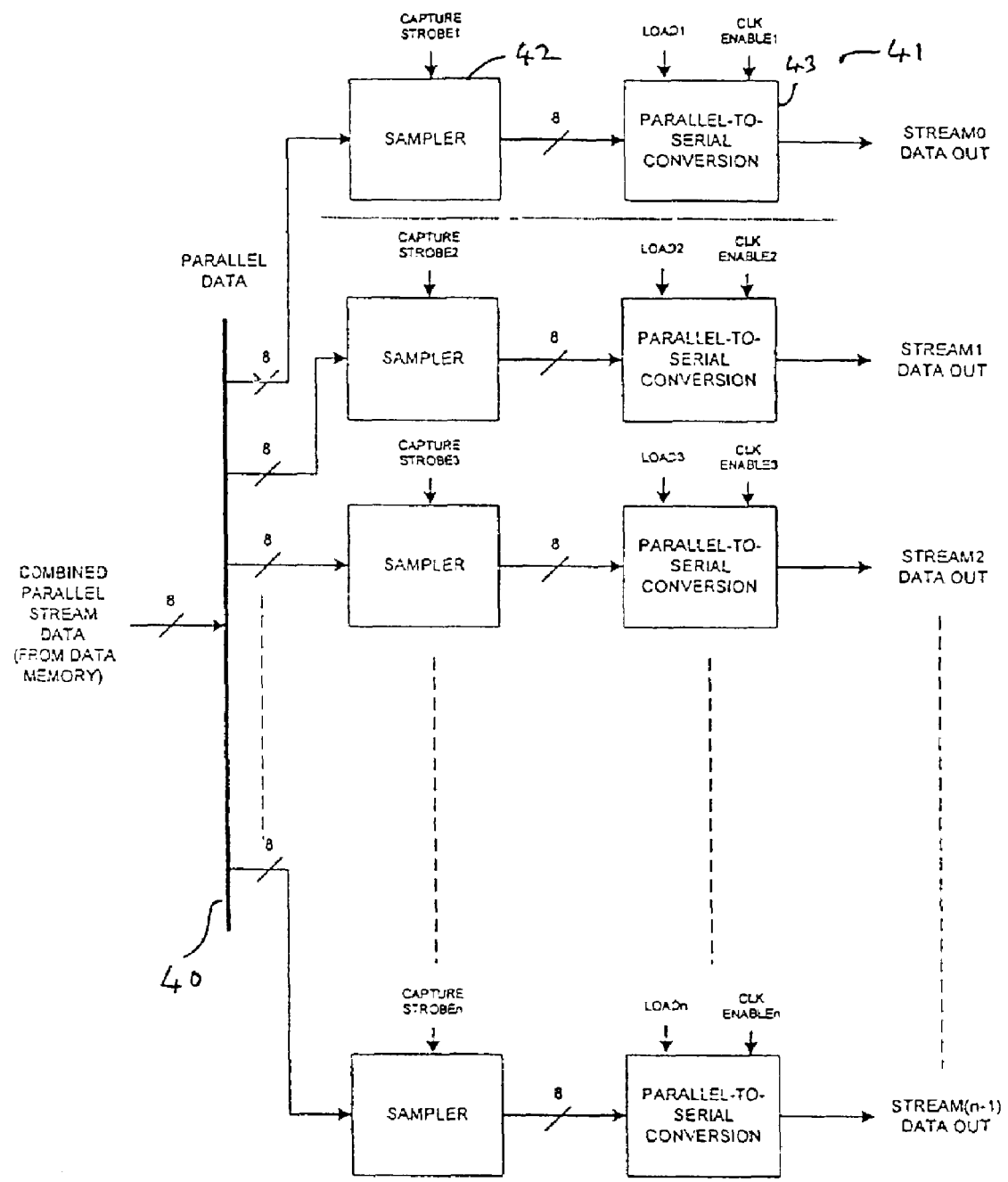
Figure 9 - OUTPUT BLOCK

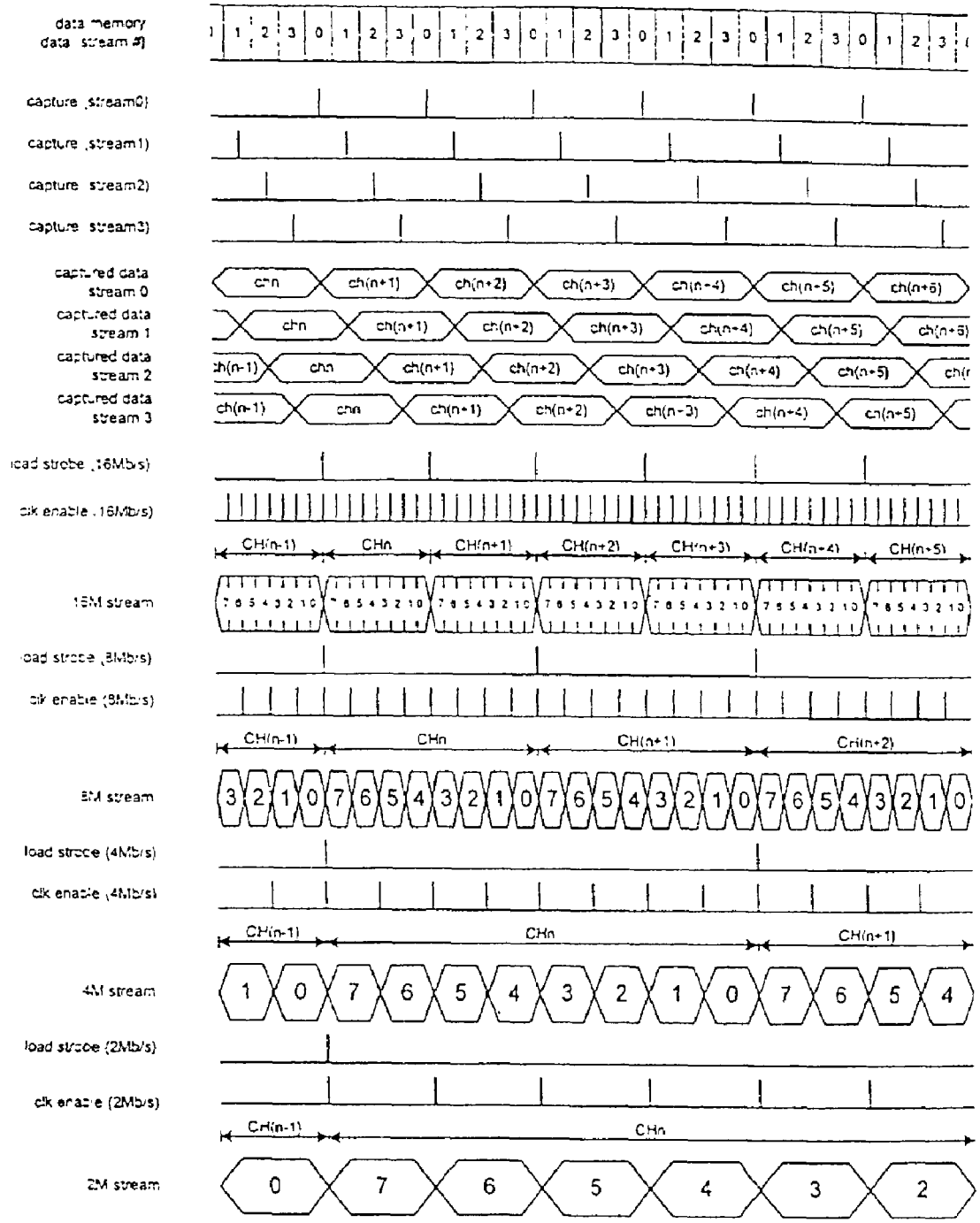
Figure 10 - Output Stream Process

APPARATUS FOR SWITCHING TIME DIVISION MULTIPLEX CHANNELS

BACKGROUND

1. Technical Field

The present invention relates to an apparatus for switching time division multiplex channels from a plurality of input data streams to a plurality of output data streams. Such apparatuses may be used in switched networks, for instance in telephone systems.

2. Background Art

Modern circuit switched networks are required to handle multiple TDM (Time Division Multiplex) data streams having different stream data rates and/or bit-channel offsets.

The stream data rate employed for TDM is 1.024 Mb/s (million bits/second) and multiples/sub-multiples thereof, i.e. 2.048 Mb/s, etc. currently reaching speeds of upto 32.768 Mb/s. The streams are divided up into a 125 μs frames which are further divided into channels, each consisting of 8 bits (binary digits). The number of channels varies in direct proportion with the stream rate, as exemplified in Table 1.

TABLE 1

Stream Rate (Mb/s) vs. Channels/Frame

| Stream Rate (Mb/s) | Channels/Frame |
|---|---|
| 1.024 | 16 |
| 2.048 | 32 |
| 4.096 | 64 |
| 8.192 | 128 |
| 16.384 | 256 |
| 32.768 | 512 |

The stream data arriving at a TDM switch on any particular stream is often offset from the nominal position of the start of channel 0 aligned to the local frame boundary. This may be for many reasons such as non-standard frame boundary signal definition within the system, system delays, etc. The range of offsets possible, usually expressed in ¼ bit increments, depends on the stream data rate, as exemplified in Table 2. A fraction bit offset is referred to as a 'step offset' herein. Thus, for example, a stream having an offset of 2 channels and 4¾ bits is described as having a channel offset of 2 channels, a bit offset of 4 bits and a step offset of ¾ of a bit.

TABLE 2

Stream Rate (Mb/s) vs. Bit/Channels Offset

| Stream Rate (Mb/s) | Bit-channel offset |
|---|---|
| 1.024 | 0–15 channels, 0–7¾ bits |
| 2.048 | 0–31 channels, 0–7¾ bits |
| 4.096 | 0–63 channels, 0–7¾ bits |
| 8.192 | 0–127 channels, 0–7¾ bits |
| 16.384 | 0–255 channels, 0–7¾ bits |
| 32.768 | 0–511 channels, 0–7¾ bits |

In TDM systems, channel data is repeated every frame at 125 μs intervals and will typically carry the information associated with one telephone call, although this is just as likely to be data traffic. Channels are allocated numbers and the convention is to number these from 0 (zero), such that, for example, a 1.024 Mb/s TDM data stream contains frames which have 16 channels numbered 0 to 15 as shown in FIG. 1.

In circuit switched networks, switching involves the transfer of channel data from a set of input streams ($SN_I$) to a set of output streams ($SN_O$). This process often involves input and output streams having different stream rates and input stream bit-channel offsets.

FIG. 2 shows a frame which illustrates TDM switching between channel 14 of a 1.024 Mb/s input stream having a channel offset of 5 channels with respect to the frame boundary reference and channel 19 of a 2.048 Mb/s output stream. Using current techniques, this involves a multi-stage process of generating intermediate streams having the same stream rate as the output stream. Known devices offer limited configurability, i.e. all input streams must have a common data rate as do all output streams.

Conventionally, the switching of channel data from TDM data streams having different rates involves a two step process:

1. First, the source stream, stream rate=$R_S$, is converted to the same stream rate as the destination stream, stream rate, $R_D$. If $R_S > R_D$, then the source stream is converted into n streams at rate $R_D$, with n being equal to the ratio $R_S/R_D$ in order to maintain the total number of channels. For example, if $R_S$=16.384 Mb/s (256 channels/frame) and $R_D$=2.048 Mb/s (32 channels/frames), then the source stream is converted into n=8 streams with rate $R_D$=2.048 Mb/s, i.e. 32×8=256. If $R_S < R_D$, then the source stream is converted into a single stream at rate $R_D$ which may either be combined with other stream(s) having rate $R_S$ or, alternatively, the unused channels in the derived stream padded with other data. The second step involves simple channel switching between the stream derived in Step 1 and the destination stream which now have the same stream rate.

SUMMARY

According to the invention, there is provided an apparatus as defined in the appended claim 1. Preferred embodiments of the invention are defined in the other appended claims.

It is thus possible to provide an apparatus for performing fully flexible multi-stream rate TDM switching using processes which maybe implemented within a single device (monolithic integrated circuit) without requiring intermediate stages of stream rate conversion and subsequent data switching. The stream rate for each input and output stream is individually selectable. Similarly, bit-channel offset can be individually compensated for each input stream. It is thus possible to reduce the complexity of the system architecture, manufacturing cost and circuit board area requirements as compared with known techniques.

BRIEF DESCRIPTION OF THE DRAWINGS

The invention will be further described, by way of example, with reference to the accompanying drawings, in which:

FIG. 1 is a diagram illustrating a TDM frame;

FIG. 2 is a diagram illustrating multi-stream rate TDM switching;

FIG. 3 is a diagram illustrating the basic architecture of an apparatus constituting an embodiment of the invention;

FIG. 4 is a block diagram illustrating in more detail the input block of the apparatus of FIG. 3;

FIG. 5 is a timing diagram illustrating input stream data processing;

FIG. 6 is a timing diagram illustrating data alignment for different stream rates;

FIG. 7 is a block diagram illustrating a channel offset block;

FIG. 8 is a block diagram illustrating an address translate block;

FIG. 9 is a block diagram illustrating an output block of the apparatus of FIG. 3; and FIG. 10 is a diagram illustrating data flow for different stream rates in the output block of FIG. 9.

DETAILED DESCRIPTION

FIG. 3 shows an apparatus for switching time division multiplex channels from a plurality of input data streams to a plurality of output data streams. Each of the input and output data streams may have any stream rate, for example as described hereinbefore, independently of the stream rates of the other streams.

The apparatus comprises an input block 1 comprising a plurality of input channels, each of which receives a respective input data stream in serial format. The input block 1 is controlled by a counter and control block 2 which receives frame pulses and a data clock. The output of the input block 1 is a parallel multiplexed data stream which is supplied to the write side of a data memory 3 forming a buffer memory.

Writing in the memory 3 is controlled by address signals generated by the block 2. The block 2 comprises a write counter 4 which supplies sequential addresses to a channel offset block 5 described in more detail hereinafter. The output of the channel offset block 5 supplies data memory write addresses to the memory 3.

The memory 3 comprises three sub-memories, each of which is capable of storing a complete frame of data for all streams at the highest stream rate. The block 2 controls which of the sub-memories is being written to and which is being read by respective select signals. Thus, while one sub-memory is being written to, another is being read from and the third remains ideal. The sub-memories are written to and read from in sequence so as to ensure that no attempt is made to read to and write from the same memory location at the same time and so as to provide a constant delay through the apparatus to ensure that there is no overlap of data.

The block 2 contains a read counter 6 which supplies sequential addresses to a connection memory 7. The data output of the memory 7 supplies read addresses to the memory 3 to ensure that the data are read out in the correct order. The connection mapping contained in the memory 7 is programmable and is changed whenever it is desired to alter the mapping of input channels to output channels. Thus, the contents of the memory 7 dictate the channel switching performed by the apparatus.

Although the memory 7 is shown in the read side of the apparatus, it could alternatively or additionally be provided in the write side between the block 2 and the memory 3.

The data read from the memory 3 are in the form of a multiplexed stream of output data and this is supplied to an output block 8 controlled by the block 2. The output block has a plurality of outputs, each of which supplies an output data stream of the apparatus.

The input TDM serial data streams are presented to the input block 1. The streams are synchronised to a data clock with frame pulses marking frame boundaries. The data clock may or may not have the same rate as the data. In the input block 1, each stream of data is sampled, delayed and converted into 8-bit parallel data (bytes), with each byte representing a channel data. The bytes are written into the data memory in stream/channel order.

To generate the output streams, the connection memory 7 is addressed in sequence and its data used to address the data memory read operations. In this way, the contents of the connection memory 7 act as a pointer to the data memory 3 providing the switch mapping. The parallel data output from the data memory 3 is converted into a serial stream and delayed by an appropriate amount to carry out frame alignment in the output block 8.

The input block is shown in more detail in FIG. 4 and comprises a plurality of input channels whose outputs are connected to a multiplexer 10. Each input channel, such as 11, is identical to each other input channel so that only the channel 11 will be described.

The input channel 11 has an input for receiving one of the data streams connected to an elastic step buffer 12. The buffer 12 is controlled by a step offset signal and step-aligns the serial data from the data stream as described in more detail hereinafter.

The step-aligned data are supplied to an elastic bit buffer 13 which is controlled by a bit offset signal so as to compensate for any bit offsets in the step-aligned data stream. The buffer 13 supplies bit-aligned data as a stream to an elastic sync stream buffer 14.

The buffer 14 is controlled by a stream rate signal and provides sync-aligned data such that a predetermined channel in a predetermined frame of the output data stream from the buffer 14 is temporarily aligned in a predetermined manner with output data streams at the outputs of the other input blocks.

The sync-aligned data stream is supplied to a serial-parallel converter 15 which converts the serial data stream into a parallel data stream comprising 8 bit words, each of which carries the data for a channel of one of the frames. The outputs of the converters of the input channels are supplied to respective inputs of the multiplexer 10, which combines the parallel streams into a combined parallel stream for the data memory 3.

The input block thus samples the serial data streams, removes any step and bit offsets, aligns each stream to the other streams taking into account the stream rates and converts the serial streams into parallel data output. Channel offsets are not dealt with in the input block but are, instead, taken into account in the write addressing of the memory 3.

Step Buffer Block

Each step buffer 12 samples the serial input stream using a strobe signal which has a period equal to the stream rate and a phase appropriate for the expected step offset. The data emerges from the buffer 12 with any fractional bit (step) offset removed. To achieve this, delay is applied to the stream which is a function of the step offset, see Table 3. FIG. 5 shows a step offset of zero; hence the step aligned data is delayed by 2 bit periods. In order to achieve this, a clock which is at least four times the maximum expected bit rate is required.

TABLE 3

Step Alignment Block-Step Offset vs. Applied Delay

| Step Offset (bits) | Applied Delay (bits) |
|---|---|
| 0 | 2 |
| ¼ | 1¾ |
| ½ | 1½ |
| ¾ | 1¼ |

Bit Buffer Block

The buffer 13 adds a delay to the data stream to remove any bit offset. Hence the delay is a function of the bit offset, see Table 4. FIG. 5 shows a bit offset of zero; hence the bit aligned data is delayed by 7 bit periods.

TABLE 4

Bit Aligned Block-Bit Offset vs. Applied Delay

| Bit Offset (bits) | Applied Delay (bits) |
|---|---|
| 0 | 7 |
| 1 | 6 |
| 2 | 5 |
| 3 | 4 |
| 4 | 3 |
| 5 | 2 |
| 6 | 1 |
| 7 | 0 |

Stream Sync Block

The Stream Sync Block adds a delay to align the data stream to account for various stream rates. Hence the delay is a function of stream rate. Table 5 shows the delays which would be required for rates of 2, 4, 8 and 16 Mb/s. The delays are determined by the lowest stream rate and are chosen such that the data is aligned as follows:

The end of the CH0 period at the highest data rate is aligned with the start of the CH0 period at the next data rate;

The end of the CH0 period at the next data rate is aligned with the start of the CH0 period at the next data rate, and so on.

For rates of 2, 4, 8 and 16 Mb/s the data emerging from the serial to parallel conversion will be as shown in FIG. 6.

TABLE 5

Stream Sync Block-Stream Rate vs. Applied Delay

| Stream Rate (Mb/s) | Applied Delay (bits) |
|---|---|
| 2 | 0 |
| 4 | 9 |
| 8 | 27 |
| 16 | 63 |

In general, in order to perform stream synchronisation, the applied delay in bit periods is equal to $(9 \times (SR/SR_{min}-1))$, where SR is the stream rate, $SR_{min}$ is the minimum or slowest stream rate of the input streams supplied to the apparatus and the value 9 is the delay in bit periods created in the step and bit alignment buffers.

FIG. 6 also illustrates when each channel is written to memory vs. stream rate. The multiplexed data combines all stream data by selecting each stream's data on a round robin basis, i.e. starting with stream 0 through to the last stream. The multiplexing cycle, i.e. the time taken to cycle around all streams, must be less than or equal to the highest byte rate, in this example 16 Mb/s.

The mapping of the data in the Data Memory and the Channel Offset Block form part of this invention.

Data is mapped into the data memory 3 to take account of channel number, stream number and stream rate. For the case of four input streams ($SN_1$ where 0<i>3) each having four possible data rates (16 Mb/s, 8 Mb/s, 4 Mb/s, 2 Mb/s), data is mapped into the data memory 3 in the following manner:

16 M streams: byte address=(((channel no.×1)+0)×4)+stream no.

8 M streams: byte address=(((channel no.×2)+1)×4)+stream no.

4 M streams: byte address=(((channel no.×4)+3)×4)+stream no.

2 M streams: byte address=(((channel no.×8)+7)×4)+stream no.

The general expression for this data mapping is given by:

$$\text{Byte Address} = ((\text{channel no.} \times SR/SR_{max}) + SR/SR_{max} - 1) \times N_s) + \text{stream no.} \quad (1)$$

where: SR=stream rate, $SR_{max}$=maximum stream rate, and $N_s$=total no. of input streams.

Using this scheme, a simple counter is used which is synchronised to the parallel data emerging from the Input block, to generate data memory write addresses. The bottom of FIG. 6 shows the key addresses which would be generated using this scheme for four stream rates of 2, 4, 8 and 16 Mb/s.

TABLE 6

Address Mapping vs. Stream/Channel

| ADDRESS | 16 Mb/s | 8 Mb/s | 4 Mb/s | 2 Mb/s |
|---|---|---|---|---|
| 0 | ST0-CH0 | — | — | — |
| 1 | ST1-CH0 | — | — | — |
| 2 | ST2-CH0 | — | — | — |
| 3 | ST3-CH0 | — | — | — |
| 4 | ST0-CH1 | ST0-CH0 | — | — |
| 5 | ST1-CH1 | ST1-CH0 | — | — |
| 6 | ST2-CH1 | ST2-CH0 | — | — |
| 7 | ST3-CH1 | ST3-CH0 | — | — |
| 8 | ST0-CH0 | — | — | — |
| 9 | ST1-CH2 | — | — | — |
| 10 | ST2-CH2 | — | — | — |
| 11 | ST3-CH2 | — | — | — |
| 12 | ST0-CH3 | ST0-CH1 | ST0-CH0 | — |
| 13 | ST1-CH3 | ST1-CH1 | ST1-CH0 | — |
| 14 | ST2-CH3 | ST2-CH1 | ST2-CH0 | — |
| 15 | ST3-CH3 | ST3-CH1 | ST3-CH0 | — |
| 16 | ST0-CH4 | — | — | — |
| 17 | ST1-CH4 | — | — | — |
| 18 | ST2-CH4 | — | — | — |
| 19 | ST3-CH4 | — | — | — |
| 20 | ST0-CH5 | ST0-CH2 | — | — |
| 21 | ST1-CH5 | ST1-CH2 | — | — |
| 22 | ST2-CH5 | ST2-CH2 | — | — |
| 23 | ST3-CH5 | ST3-CH2 | — | — |
| 24 | ST0-CH6 | — | — | — |
| 25 | ST1-CH6 | — | — | — |
| 26 | ST2-CH6 | — | — | — |
| 27 | ST3-CH6 | — | — | — |
| 28 | ST0-CH7 | ST0-CH1 | ST0-CH1 | ST0-CH0 |
| 29 | ST1-CH7 | ST1-CH3 | ST1-CH1 | ST1-CH0 |
| 30 | ST2-CH7 | ST2-CH1 | ST2-CH1 | ST2-CH0 |
| 31 | ST3-CH7 | ST3-CH3 | ST3-CH1 | ST3-CH0 |
| . | . | . | . | . |
| . | . | . | . | . |
| . | . | . | . | . |
| 992 | ST0-CH248 | — | — | — |
| 993 | ST1-CH248 | — | — | — |
| 994 | ST2-CH248 | — | — | — |
| 995 | ST3-CH248 | — | — | — |
| 996 | ST0-CH249 | ST0-CH124 | — | — |
| 997 | ST1-CH249 | ST1-CH124 | — | — |
| 998 | ST2-CH249 | ST2-CH124 | — | — |
| 999 | ST3-CH249 | ST3-CH124 | — | — |
| 1000 | ST0-CH250 | — | — | — |
| 1001 | ST1-CH250 | — | — | — |
| 1002 | ST2-CH250 | — | — | — |
| 1003 | ST3-CH250 | — | — | — |
| 1004 | ST0-CH125 | ST0-CH125 | ST0-CH62 | — |
| 1005 | ST1-CH251 | ST1-CH125 | ST1-CH62 | — |
| 1006 | ST2-CH251 | ST2-CH125 | ST2-CH62 | — |
| 1007 | ST3-CH251 | ST3-CH125 | ST3-CH62 | — |
| 1008 | ST0-CH252 | — | — | — |

TABLE 6-continued

Address Mapping vs. Stream/Channel

| ADDRESS | 16 Mb/s | 8 Mb/s | 4 Mb/s | 2 Mb/s |
|---------|---------|--------|--------|--------|
| 1009 | ST1-CH252 | — | — | — |
| 1010 | ST2-CH252 | — | — | — |
| 1011 | ST3-CH252 | — | — | — |
| 1012 | ST0-CH253 | ST0-CH126 | — | — |
| 1013 | ST1-CH253 | ST1-CH126 | — | — |
| 1014 | ST2-CH253 | ST2-CH126 | — | — |
| 1015 | ST3-CH253 | ST3-CH126 | — | — |
| 1016 | ST0-CH254 | — | — | — |
| 1017 | ST1-CH254 | — | — | — |
| 1018 | ST2-CH254 | — | — | — |
| 1019 | ST3-CH254 | — | — | — |
| 1020 | ST0-CH255 | ST0-CH127 | ST0-CH63 | ST0-CH31 |
| 1021 | ST1-CH255 | ST1-CH127 | ST1-CH63 | ST1-CH31 |
| 1022 | ST2-CH255 | ST2-CH127 | ST2-CH63 | ST2-CH31 |
| 1023 | ST3-CH255 | ST3-CH127 | ST3-CH63 | ST3-CH31 |

To take account of channel offset, the address (address in) generated by the aforementioned counter is fed into the channel offset block 5 which calculates the channel offset address using the stream number as a look-up. This block is shown in FIG. 7. The address may be considered to be made up of two fields, a stream field and a channel field. The channel offset is then subtracted in a subtraction unit 31 from the channel field of the address to generate the actual channel number. This together with the original stream field, forms the write address (address out) to the Data Memory 3.

As for the data memory, data is mapped into the connection memory 7 to take account of channel number, stream number and stream rate. For the case of four streams each having four possible data rates (16 Mb/s, 8 Mb/s, 4 Mb/s, 2 Mb/s) data is mapped into the data memory in the following manner:

16 M streams: byte address=(((channel no.×1)+0)×4)+stream no.

8 M streams: byte address=(((channel no.×2)+1)×4)+stream no.

4 M streams: byte address=(((channel no.×4)+3)×4)+stream no.

2M streams: byte address=(((channel no.×8)+7)×4)+stream no.

The more general expression for the mapping is the same as for the write address (equations (1)) with $N_s$, in this case, referring to the total number of output streams.

Using this scheme, a simple counter may be used which is synchronised to the parallel data emerging from the Input block 1 but is offset from it to generate connection memory read addresses. The read data from the connection memory 7 which is made up of destination stream and channel information, is fed into an address translation block, as shown in FIG. 8, to match the addressing scheme in the data memory. The address translate block comprises a rate lookup unit 32 and a translate unit 33. The translation performs the calculations detailed above. The address out of the address translation block forms the read address to the data memory.

The output block 8 is shown in more detail in FIG. 9 and the corresponding timing diagram of the signals occurring in the output block is shown in FIG. 10. The output block comprises a demultiplexer 40 which separates the output data streams and supplies each to a respective output circuit. The output circuits are identical to each other and only that indicated at 41 will be described.

The 8 bit parallel data from the demultiplexer are fed to a sampler which receives a capture strobe signal supplied by the control block 2. The capture strobe signal is active only when data from the demultiplexer intended for the output channel are present at the output of the memory 3. The sampler therefore captures the output stream from the data appearing at the output of the memory 3.

The 8 bit parallel data are supplied to a parallel-to-serial converter 43, which is controlled by a load signal and a clock enable signal. The load signal loads the parallel data into the converter 43 has a period equivalent to the expected stream rate for the output stream. Thus, invalid data emerging from the data memory 3 for lower stream rates is discarded. The clock enable signals then clock out the captured data to form a serial bit stream.

What is claimed is:

1. An apparatus for switching time division multiplex channels from a plurality of input data streams, each of which may have any one of a plurality of data rates, to a plurality of output data streams, each of which may have any one of a plurality of data rates, comprising:

a respective input channel for each input data stream, each input channel comprising a variable delay circuit;

a buffer memory for storing data from the input channels in a first order and for reading data in a second order; and a controller for controlling the variable delay circuits independently of each other such that predetermined channels in respective ones of the input data streams are available for storing in a predetermined temporal order in the buffer memory irrespective of the data rates of the input data streams;

wherein each of the input data streams is a serial data stream;

wherein each of the variable delay circuits comprises a third subcircuit for delaying the input data stream so as to compensate for different data rates of the input data streams, each of the variable delay circuits comprises a first subcircuit for delaying the input serial data stream so as to compensate for a fraction of a bit period offset in the input serial data stream, and each of the variable delay circuits comprises a second subcircuit for delaying the input of a data stream so as to compensate for a fraction of a data word period offset in the input serial data stream, wherein the third subcircuit of each input channel is controlled to provide a delay $D_S$ in bit periods at the stream rate SR of the input stream given by:

$$D_S = A\,(SR/SR_{min} - 1)$$

where $SR_{min}$ is the slowest stream rate of all the input streams and A is the sum of the maximum delays of the first and second subcircuits in bit periods at the stream rate SR.

2. An apparatus as claimed in claim 1, in which the predetermined temporal order is consecutively.

3. An apparatus as claimed in claim 1, in which the predetermined channels are zeroth channels.

4. An apparatus as claimed in claim 1, in which at least one of the first and second orders is programmable for controlling the channel switching.

5. An apparatus as claimed in claim 1, in which the buffer memory is arranged to write data words from the input channels in byte addresses given by:

$$\text{byte address} = (((C_i \cdot SR/SR_{max}) + SR/SR_{max} - 1)N_i) + SN_i$$

where $C_i$ is the input channel number, SR is the input stream rate, $SR_{max}$ is the stream rate of the fastest input stream, $N_i$ is the number of input streams, and $SN_i$ is the input stream number.

6. An apparatus as claimed in claim 5, in which the buffer memory is arranged to read data words stored therein from byte addresses given by:

byte address=$(((C_o \cdot SR'/SR'_{max})+SR'/SR'_{max}-1)N_o)+SN_o$ where $C_o$ is the output channel number, SR' is the output stream rate, $SR'_{max}$ is the stream rate of the fastest output stream, $N_o$ is the number of output streams, and $SN_o$ is the output stream number.

* * * * *